United States Patent
Xu et al.

(10) Patent No.: US 9,152,305 B2
(45) Date of Patent: Oct. 6, 2015

(54) SYSTEMS AND METHODS FOR PRESENTATIONS WITH LIVE APPLICATION INTEGRATION

(71) Applicants: Kai Xu, Palo Alto, CA (US); Michelangelo Capraro, Palo Alto, CA (US); Scott McGhee, Palo Alto, CA (US); Thanh Phan, Palo Alto, CA (US); Lei Wang, Palo Alto, CA (US)

(72) Inventors: Kai Xu, Palo Alto, CA (US); Michelangelo Capraro, Palo Alto, CA (US); Scott McGhee, Palo Alto, CA (US); Thanh Phan, Palo Alto, CA (US); Lei Wang, Palo Alto, CA (US)

(73) Assignee: SuccessFactors, Inc., South San Francisco, CA (US)

( * ) Notice: Subject to any disclaimer, the term of this patent is extended or adjusted under 35 U.S.C. 154(b) by 149 days.

(21) Appl. No.: 13/931,437

(22) Filed: Jun. 28, 2013

(65) Prior Publication Data

US 2015/0007034 A1    Jan. 1, 2015

(51) Int. Cl.
*G06F 3/0484* (2013.01)
*G06F 17/30* (2006.01)

(52) U.S. Cl.
CPC ........ *G06F 3/0484* (2013.01); *G06F 17/30056* (2013.01)

(58) Field of Classification Search
CPC ............................ G06F 3/048; G06F 17/30056
USPC ........................................................ 715/730
See application file for complete search history.

(56) References Cited

U.S. PATENT DOCUMENTS

| | | | |
|---|---|---|---|
| 8,745,267 B2 * | 6/2014 | Luecke et al. | 709/241 |
| 8,868,574 B2 * | 10/2014 | Kiang et al. | 707/754 |
| 8,914,900 B2 * | 12/2014 | Smith et al. | 726/27 |
| 2004/0130566 A1 | 7/2004 | Banerjee et al. | |
| 2005/0091579 A1 | 4/2005 | Mewherter et al. | |
| 2005/0154679 A1 | 7/2005 | Bielak | |
| 2009/0031212 A1 * | 1/2009 | Hsu | 715/234 |
| 2010/0169951 A1 * | 7/2010 | Vaughan et al. | 726/3 |
| 2011/0016195 A1 * | 1/2011 | Kaplan et al. | 709/219 |
| 2012/0136968 A1 * | 5/2012 | Wojcik et al. | 709/219 |
| 2012/0192055 A1 | 7/2012 | Antebi et al. | |
| 2015/0007040 A1 * | 1/2015 | Xu et al. | 715/738 |

OTHER PUBLICATIONS

Poole et al.: "Essential Microsoft Office 2000: Tutorial for Teachers"; Powerpoint Presentations—Creating slide shows and related teaching materials; Learning Outcomes; Jan. 1, 2000; pp. 210-235.
Extended European Search Report for EP14002199.9 dated Nov. 28, 2014; 11 pages.

* cited by examiner

*Primary Examiner* — David Phantana Angkool
(74) *Attorney, Agent, or Firm* — Fountainhead Law Group PC

(57) ABSTRACT

The present disclosure includes presentations with pages that access data from backend applications. In one embodiment, a system is disclosed where presentation pages are sent from a server and received in a client. The presentation pages may include static pages and interactive pages. Interactive pages include active regions that may be selected to access features on server applications. In one embodiment, an active region may be a portion of a presentation page that is selectable to access an application feature. In another embodiment, an active region may be a presentation page that interactively exposes an application feature in the presentation page.

11 Claims, 10 Drawing Sheets

SYSTEMS AND METHODS FOR PRESENTATIONS WITH LIVE APPLICATION INTEGRATION

BACKGROUND

The present invention relates to computing and data processing, and in particular, to presentations that are integrated with software applications.

PowerPoint® is a typical example of contemporary presentation software. In a typical presentation system, a user is provided with blank sheets and a variety of images and text may be included on each page to create a presentation. The pages of the presentation are typically stored in a proprietary format, such as ".ppt," that is understood by a presentation program running on a local system.

A user may present information to an audience by displaying the presentation on a monitor, an overhead projector, or in a web meeting, for example. A user typically starts the presentation software running on a local client computer and loads a presentation that has been preconfigured and saved in a format understandable by the presentation software.

While a wide variety of content is available in existing presentation software systems, such content is usually static in the sense that it is defined before the presentation is given to an audience and does not provide the audience with any content that changes based on interactions with the audience. For example, traditional forms of content include text, images, graphs, sound, and even video. However, such content is typically static, and cannot provide new information dynamically and interactively in response to questions that may arise from an audience during a presentation.

SUMMARY

Embodiments of the present disclosure provide presentations with live application integration. Presentations may include pages that access data from backend applications. In one embodiment, a system is disclosed where presentation pages are sent from a server and received in a client. The presentation pages may include static pages and interactive pages. Interactive pages include active regions that may be selected to access features on server applications. In one embodiment, an active region may be a portion of a presentation page that is selectable to access an application feature. In another embodiment, an active region may be a presentation page that interactively exposes an application feature in the presentation page.

In one embodiment, the present invention includes a method comprising receiving a plurality of presentation pages on a client computer from a server computer, the presentation pages comprising static pages and interactive pages arranged in a predetermined sequence, where the static pages comprise static data and the interactive pages comprise one or more active regions, where each active region is associated with a server application feature, displaying the presentation pages on the client computer sequentially in the predetermined sequence, receiving, on the client computer, a selection of one of said active regions, sending, in response to a selected active region on a particular interactive page, a message specifying a particular server application feature associated with the selected active region to access data corresponding to the particular server application feature, receiving the data corresponding to the particular server application feature associated with the selected active region in the client computer to be rendered on the particular interactive page.

In one embodiment, in a timeline display mode a plurality of the presentation pages are displayed together in the predetermined sequence and in a presentation display mode the presentation pages are displayed one at a time in the predetermined sequence.

In one embodiment, the method further comprises receiving, in the client computer, changes to the data, and modifying the data in a server application including the particular server application feature.

In one embodiment, the method further comprises uploading a presentation having a first file type, wherein the presentation is translated into a plurality of images, specifying one or more active regions on particular portions of one or more of said images, and configuring the one or more active regions to access one or more server application features on one or more server applications.

In one embodiment, the method further comprises uploading a presentation having a first file type, wherein the presentation is translated into a plurality of images, adding a presentation page to the presentation, the presentation page comprising an active region that interactively exposes a particular server application feature in the added presentation page, and configuring the active region in the added presentation page to access the particular server application feature.

In one embodiment, the method further comprises uploading a presentation having a first file type, parsing the presentation to extract text according to a predefined criteria, and automatically configuring one or more active regions to access one or more server application features on one or more server applications based on the extracted text.

In one embodiment, the presentation is translated into a plurality of images, and the one or more active regions are configured on portions of the images comprising text that matches extracted text.

In one embodiment, the static pages are images, and wherein one or more interactive pages comprise images and active regions specified on particular portions of the images.

In one embodiment, the data corresponding to the particular server application feature associated with the selected active region is displayed as a pop-up over one of the interactive page images.

In one embodiment, the static pages are images, and wherein one or more interactive pages comprise an active region that interactively exposes specified server application features in a presentation page.

In one embodiment, each presentation page has corresponding metadata, and metadata for interactive pages specifies the server application feature associated with each active region.

In one embodiment, static pages comprise metadata specifying a location of an image for each static page.

In one embodiment, one or more interactive pages comprise metadata specifying a location of an image for a corresponding interactive page and metadata specifying, for each active region on each interactive page, one or more custom parameters for accessing data for the server application feature.

In one embodiment, metadata for one or more interactive pages further comprises one or more custom parameters for interactively exposing the particular server application feature in a presentation page.

In one embodiment, the method further comprises receiving rendering code to render the metadata and data in a display.

In one embodiment, the rendering code instantiates different classes for different server application features associated with each active region to access specified server application features.

In one embodiment, each presentation page has a page type specified in the metadata, and wherein the rendering code receives metadata specifying that a first presentation page has a first page type that corresponds to a first server application feature, and wherein the rendering code instantiates a class for interfacing with the first server application feature based on the page type.

In one embodiment, each presentation page has a page type specified in the metadata, and wherein the rendering code receives metadata specifying that a first presentation page has a first page type having an image and an active region associated with a first server application feature, and wherein the rendering code instantiates a class for interfacing with the first server application feature based on metadata describing the active region.

In another embodiment, the present invention includes a method comprising receiving a plurality of static presentation pages on a server computer in a first format, converting the static presentation pages into a second format on the server computer, specifying, on the server computer, one or more active regions on one or more of the converted static presentation pages, associating, on the server computer, the active regions with one or more server application features to produce one or more interactive presentation pages, and sending the converted static presentation pages and the interactive presentation pages from the server computer to a client computer for display using the second format, wherein the converted static presentation pages and the interactive presentation pages are arranged in a predetermined sequence, and wherein the interactive presentation pages are configured to generate a message to a particular server application feature when an associated active region is selected and receive data from the particular server application feature in response to the message.

In one embodiment, in a timeline display mode, a plurality of the presentation pages are displayed together in the predetermined sequence, and in a presentation display mode, the presentation pages are displayed one at a time in the predetermined sequence.

In one embodiment, an interactive page including said selected active region is configured to receive changes to the data from a user, and said interactive page is further configured to modify the data in a server application including the particular server application feature.

In one embodiment, the static presentation pages are converted into images and the active regions are specified on the images.

In one embodiment, each converted presentation page and interactive page has corresponding metadata, and metadata for the interactive pages specifies the server application feature associated with each active region.

In one embodiment, the method further comprises sending rendering code from the server computer to the client computer to render the converted presentation pages and the interactive pages for display and to instantiate one or more classes to access server application features associated with each active region.

In one embodiment, the rendering code instantiates different classes for different server application features associated with each active region to access specified server application features.

In another embodiment, the present disclosure includes a computer system comprising a processor and a non-transitory computer readable medium having stored thereon one or more programs, which when executed by the processor, causes the processor to perform the techniques set forth herein.

In another embodiment, the present disclosure includes a non-transitory computer readable storage medium storing one or more programs, the one or more programs comprising instructions for performing the techniques set forth herein.

The following detailed description and accompanying drawings provide a better understanding of the nature and advantages of the present disclosure.

DETAILED DESCRIPTION

Described herein are techniques for presentations with live application integration. The apparatuses, methods, and techniques described below may be implemented as a computer program (software) executing on one or more computers. The computer program may further be stored on a tangible non-transitory computer readable medium, such as a memory or disk, for example. A computer readable medium may include instructions for performing the processes described below. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Figure 1:
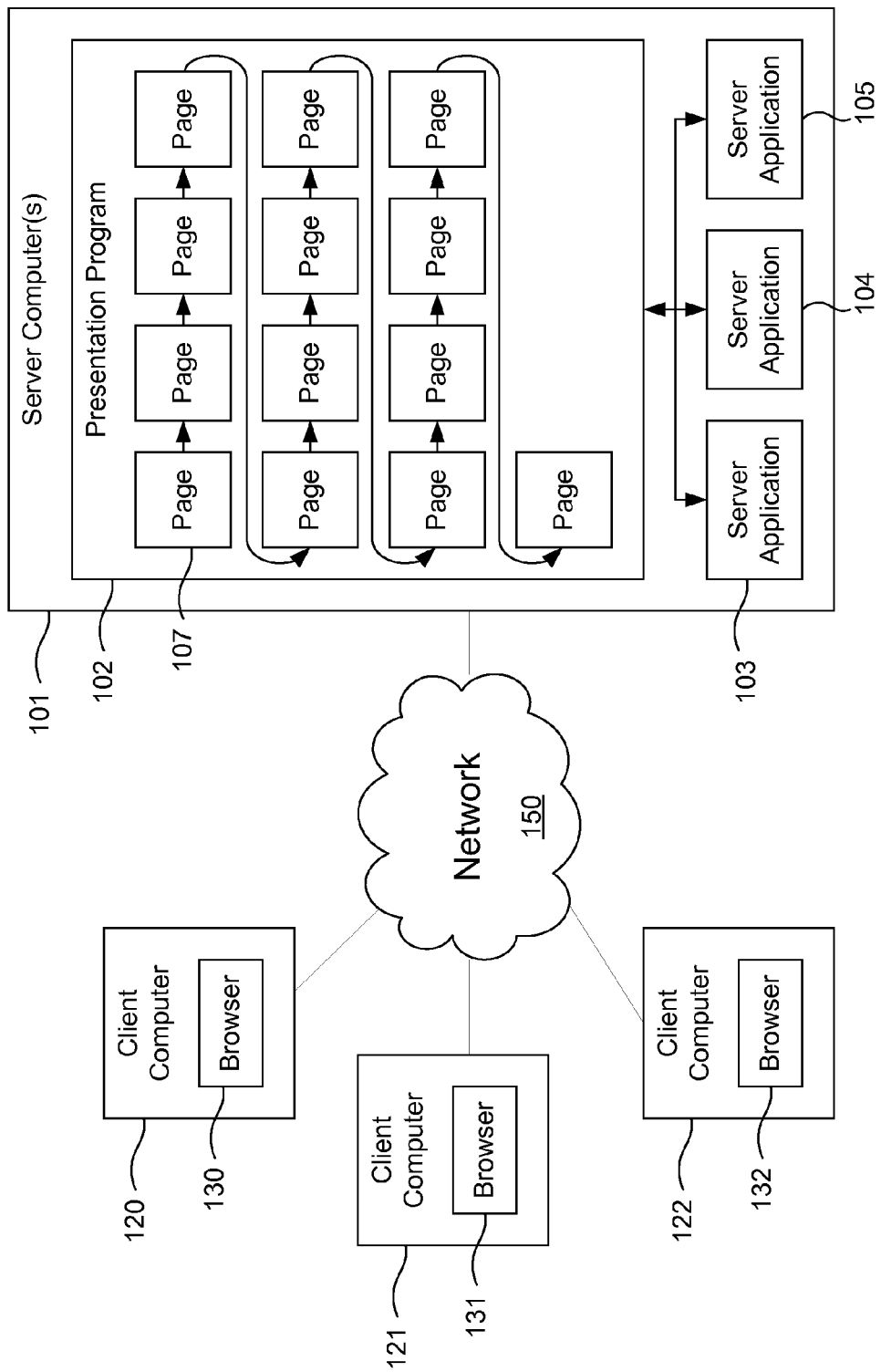
FIG. 1 illustrates interactive presentation pages according to one embodiment.

FIG. 1 illustrates interactive presentation pages according to one embodiment. As illustrated in FIG. 1, one or more server computers 101 (or just, "servers") execute one or more server applications 103-105 (also referred to as "Backend Applications"). Server computers 101 may also execute a presentation program 102 to provide interactive presentation pages as described herein. Embodiments of presentation program 102 may be integrated as a component of one or more server applications or it may be a stand-alone program executing on servers 101. In one embodiment, servers 101 may be a cloud computing system executing software programs that are provided as software services (e.g., Software-as-a-Service). Servers 101 may connect to other remote systems such as one or more client computers 120-122 over a network 150, for example. Network 150 is illustrative of one or more networks for communicating information with other computer systems, such as a cellular communication system, an Ethernet network, the Internet, or a wireless network, for example. Client computers may be personal desktop computers, laptop computers, or mobile computing devices such as a mobile phone, a smartphone, or a tablet computer, for example. Such client computers may include one or more processors and memory for storing instructions to perform a wide variety of features and functions, including the features described herein. Client computers 120-122 may receive and send information from/to backend applications 103-105 and presentation program 107 using a local program, such as a browser, for example.

Features and advantages of the present disclosure include generating interactive presentation pages that may be used to present and interact with features of one or more server applications. In one embodiment, a user may upload a static presentation, such as PowerPoint®, and the system may convert the static presentation into a different format. A user may specify active regions in existing pages or create active regions in entirely new pages to interact with features of server applications during a presentation. When an active region in an interactive page of a presentation is selected by a user (e.g., using a mouse click), new data may be retrieved from a server application and displayed to the user in the presentation. In one embodiment, a user may change the data in the presentation and update the server application. Integrating one or more application server features into a presentation allows users to enrich their presentations by supporting a wider range of questions, answers, and interactivity with a broader range of information.

Presentation program 102 includes presentation pages 107. The presentation pages may include static pages and interactive pages. Static pages may include static data such an image or other static content that may be converted from an uploaded presentation, such as PowerPoint. For example, each page of a PowerPoint presentation may be turned into an image and stored on a server. As described in more detail below, the PowerPoint presentation may be parsed, and text may be extracted and used for a variety of purposes.

Interactive pages include one or more active regions. Active regions are portions or areas of the presentation that a user may select to interact with remote server applications, for example. Interactive pages may include user defined active regions specified at specific locations of existing static pages (referred to as "hotspots"), for example, or an active region may interactively expose specified server application features in a presentation page (referred to as "Live Pages" or "Live Slides"). Accordingly, an active region may encompass all, or substantially all, of a presentation page that may be added to an uploaded and transformed static presentation, for example.

As illustrated in FIG. 1, presentation pages 107 may be arranged in a predetermined sequence. If a user on a client computer accesses the presentation pages on the presentation program 102, the presentation pages are displayed sequentially in the predetermined sequence. In one example implementation described in more detail below, the presentation pages are stored in an array, where each array element stores information for a different presentation page. Further distinguishing presentation pages from typical web pages, some embodiments may display the presentation pages in either a timeline display mode or a presentation display mode. In a timeline mode, the presentation pages are displayed together in the predetermined sequence. For example, the pages may be zoomed out to see previous and subsequent pages, all of the pages, or the pages may be presented as thumbnails of each slide. In one embodiment, no interaction with the slides may be possible in timeline mode. Some embodiments may allow a user to reconfigure the sequence of the pages by selecting a particular page in timeline mode and moving the page to a new location in the sequence. In a presentation display mode, the presentation pages are displayed one at a time in the predetermined sequence. In presentation display mode, a user may move from page to page (e.g., using a "page down" key or "clicking" on a "Next" button), where each page is presented to the user in a full, or substantially full, screen, window, or other viewport, for example. In presentation mode, the current page may be zoomed in 100% and the user may be allowed to interact with the contents of the slide. In presentation mode, there may not be any header or footer, and the contents may take up the entire viewport, for example.

Figure 2:
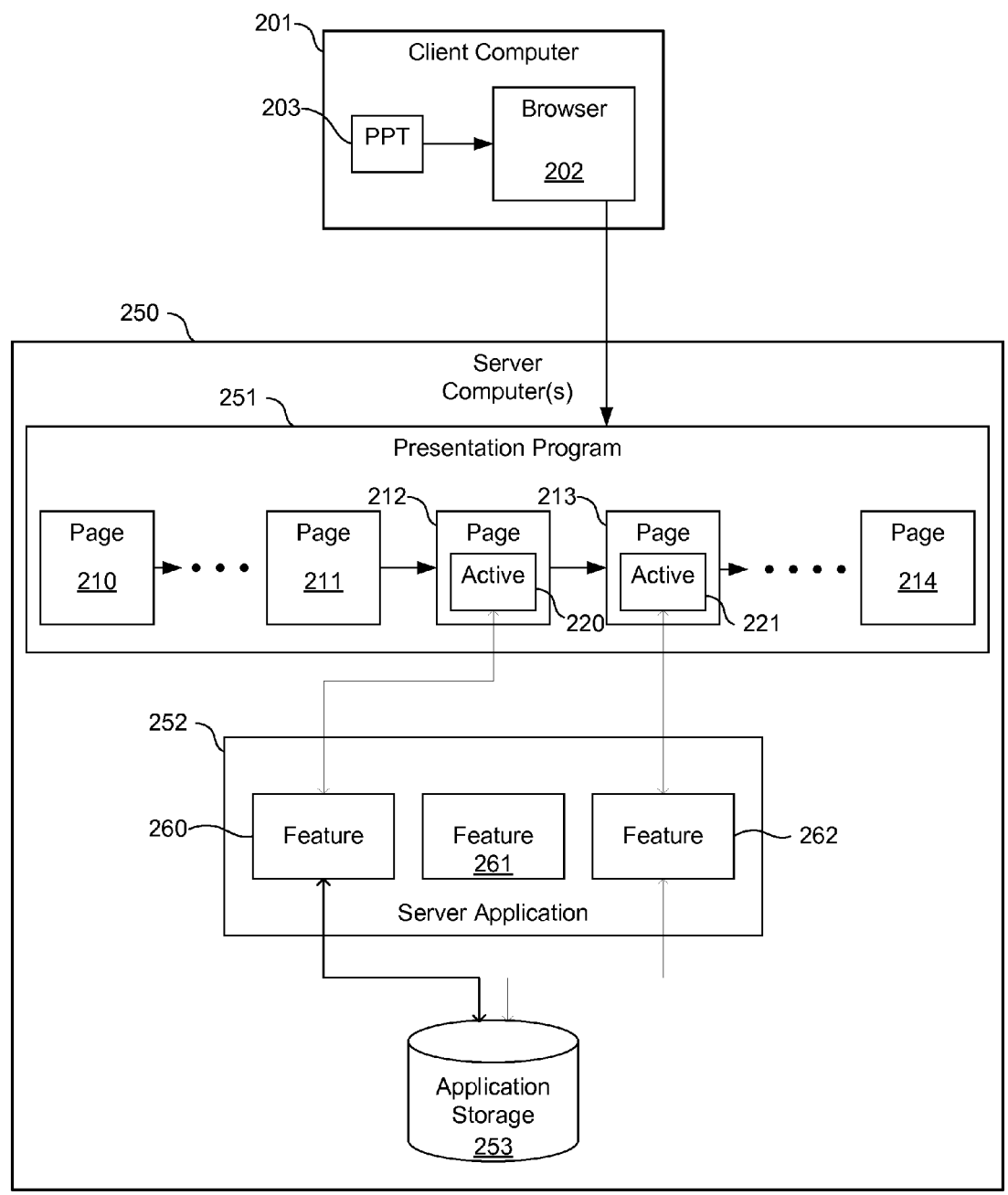
FIG. 2 illustrates interactive presentation page integration with server applications according to another embodiment.
Figure 3:
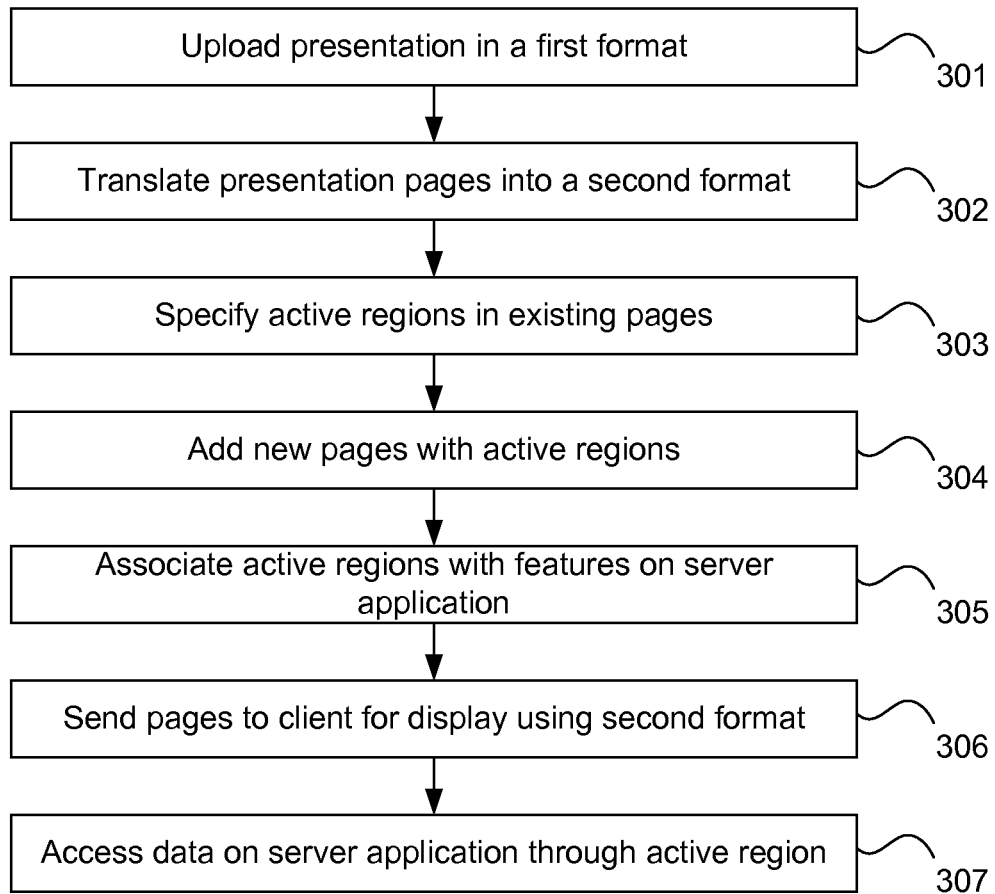
FIG. 3 illustrates an algorithm for converting a static presentation into an interactive presentation according to one embodiment.

FIG. 2 illustrates interactive presentation page integration with server applications according to another embodiment. In this example, a PowerPoint presentation (PPT) 203 is uploaded from a client computer 201 through a browser 202 to presentation program 251 operating on server computer system 250. FIG. 3 illustrates a process according to one embodiment. Referring to FIG. 3, at 301 a presentation (e.g., PowerPoint) may be uploaded in a first format. For example, the user may login to the presentation program using browser 202. An authentication process may be used to allow the user to access the presentation program 251 and other server applications, for example. Presentation program 251 may receive static presentation pages on a server in a first format (e.g., ".ppt"). At 302, the static presentation pages received from the client computer are translated into a second format on the server. For example, presentation program 251 may parse a PowerPoint presentation and extract images and text from each page. In one embodiment, each page of the uploaded presentation is transformed into an image (i.e., a full page image) including all the sub-images and text of each page. Presentation program 251 may store the information for each page in a native format. In one example embodiment described in more detail below, images and text from presentations are stored as metadata, where each presentation page has corresponding metadata that may include the images and text. For example, metadata for a page may include a path to the stored full page image of the entire page (including text). Full page images of a static page may be rendered by displaying the image of the PowerPoint, for example.

In one embodiment, a presentation may have metadata for the presentation as a whole. Such metadata may include groupings of pages (e.g., chapters of a presentation), a name of the presentation, or data extracted from an uploaded presentation that may be used for a variety of interactive functions. For example, in one embodiment, presentation metadata may include text extracted from a presentation and used to search the presentation (e.g., searchable text) or for automatically configuring active regions. For instance, in one embodiment a presentation is uploaded in a particular file type (e.g., .ppt). The presentation may be parsed to extract text according to some predetermined criteria. For example, a list of names may be provided to extract particular names found in the presentation text. In one embodiment, the uploaded presentation is converted into static images. If names are found in the presentation, the converted presentation may be automatically configured with active regions to access server application features based on the extracted text. As an example, if the name John Smith is in the list of names and also found in the presentation, an active region may be configured on the location of the presentation where the name John Smith appears (i.e., where the extracted text matches the text on the image). When a user views the presentation, the user may select the active region to access a backend server application to obtain more information about John Smith.

At 303, active regions may be specified in existing static presentation pages. For example, a particular presentation page may include a particular sub-image or text, and it may be desirable to activate a feature 260 of a server application 252 by selecting the sub-image or text. Accordingly, a user may specify a particular area of a full page image to be an active region, for example, such as active region 220 on presentation page 212. As described further below, active regions may be geometric shapes such as circles, rectangles, polygons, or the like. A user may draw a box around text in the full page image for a name "Tom Jones," for example, and once configured the region inside the box may become an active region (e.g., a "hotspot") that a user may click on to access the feature on the application server.

At 304, new interactive pages ("Live Pages") with active regions may be added to the presentation. For example, a user may upload and translate PPT 203 and select "Add Live Page," which may add a new presentation page 213 having an active region 221 to the presentation. Active region 221 may be configured to access a particular feature 262 on server 252, for example. Accordingly, when a user views or otherwise navigates to presentation page 213, active region 221 is selected to expose feature 262 in the presentation. As described in more detail below, active regions in Live Pages may retrieve and display server application pages including multiple user interface elements that may be selectable. Additional details of example Live Pages are provided below.

At 305, active regions are associated with features on one or more server applications. As mentioned above, different active regions may be used to access different features found on the same or different server applications. Some presentations may use active regions that access different features of the same server application, while other presentations may use active regions that interact with features on multiple different server applications. In one embodiment, an active region may be created, and a configuration process may be performed to setup the active region with information to interact with a particular server application feature. For example, an active region may have associated information including a name of an application feature (e.g., a software service) and feature specific parameters (e.g., custom fields) for interacting with the application feature. When a user creates an active region, presentation program 251 may access and display a feature specific configuration process steps to guide the user in entering the information necessary for interacting with a particular feature.

At 306, static and interactive presentation pages may be sent for display using the native format. For example, presentation page 210-214 may be sent from presentation program 251 to browser 202 on client computer 201. In one example implementation described in more detail below, Javascript is provided to browser 202. Javascript receives and interprets metadata for the presentation pages and generates calls to software services that implement the associated features of a server application, for example. At 307, data may be accessed on the server application through the active region. For example, selecting active region 220 to interact with feature 260 on server application 252 may produce a query to application storage 253 (e.g., a database) to retrieve data specific to the invoked feature. Accordingly, a presentation may be displayed to a user, and the user may select active regions in the presentation (e.g., hotspots or Live Pages) to interact with backend resources. When a user has selected a particular active region on a particular interactive page, a request may be sent to a particular feature associated with the selected active region to access data from a database. The data may be sent to the client to be rendered on a page of the presentation. In some embodiments, a user may change the data in the presentation, and the data may be sent to the feature in the server application and updated in the database, for example, which advantageously provides presentations with both data access and modification capability for more efficient collaboration.

Figure 4:
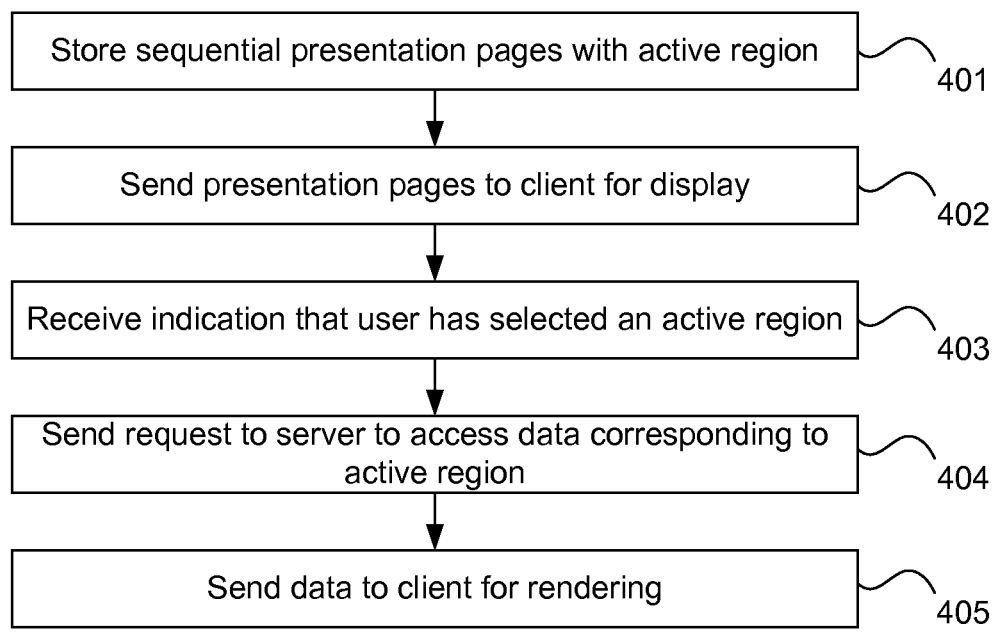
FIG. 4 illustrates an algorithm according to another embodiment.

FIG. 4 illustrates an algorithm according to another embodiment. At 401, sequential presentation pages with active regions are stored on a remote system, such as a cloud computing system, for example. The presentation pages may be stored in a native format, for example. At 402, the presentation pages are sent to a client for display, which may use a browser, for example. At 403, the system may receive an indication that a user has selected an active region. The user may "mouse click" or "touch" an active region in an interactive page, which may generate a signal to the remote system indicating that the active region in the page has been activated. In one example embodiment, an AJAX call may be generated to access a feature on a server application. At 404, a request is sent to the server to access data corresponding to the active region. As mentioned above, a feature of a server application may be connected to a database, and a call to the feature may generate a query that retrieves data specified in the call. At 405, the data is sent to the client for rendering in the display.

Figure 5A:
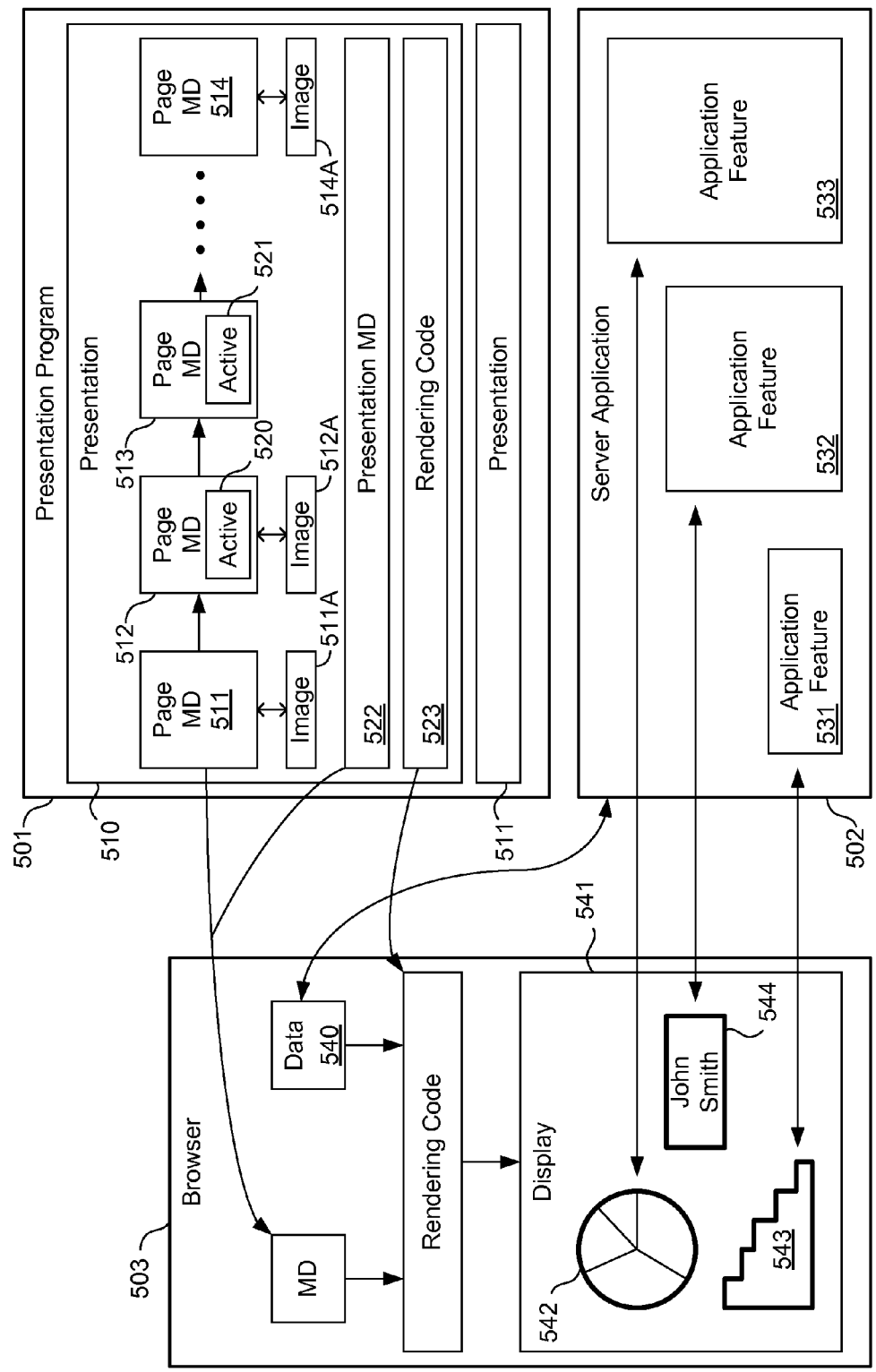
FIGS. 5A-C illustrate an example of hotspots according to one embodiment.
Figure 5B:
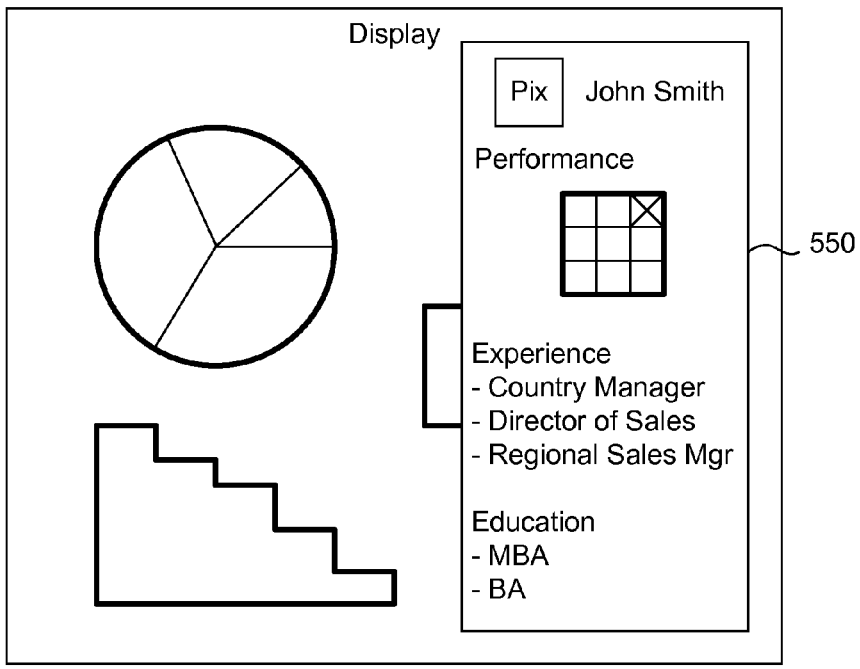
Figure 5C:
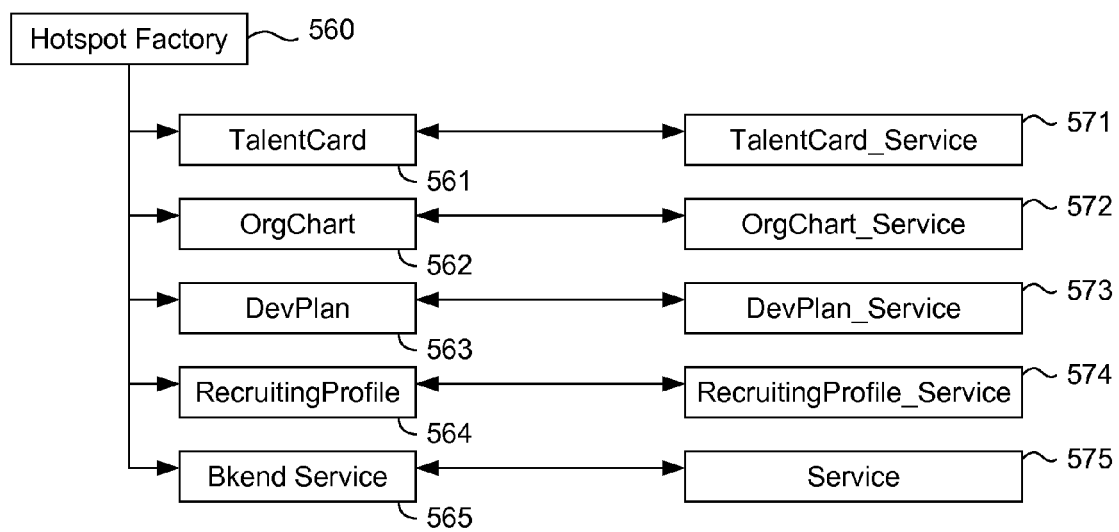

FIGS. 5A-C illustrate an example of hotspots according to one embodiment. In this example, presentation program 501 may include presentations 510 and 511. Presentation 510 includes presentation pages 511-514. Each presentation page may include corresponding metadata, for example. In this example, metadata for each page references an image for the page. For example, metadata for page 511 references an image 511A. For a static page, the image may be displayed as the presentation page and may include pictures, text, charts, or tables, for example, presented to a user as a single image 511A. Interactive pages may include metadata referencing an image for the page, and may further include metadata describing active regions in the page (e.g., defined by a user). For instance, presentation pages 512 and 513 are interactive pages including active regions (e.g., hotspots) 520 and 521, respectively. The metadata may specify an image 512A for the page and further specify the active regions, including backend features that are invoked when the active region is selected. Presentation 510 may further include metadata for the presentation as a whole 522, which may include groupings of pages (e.g., chapters of a presentation), a name of the presentation, or data extracted from an uploaded presentation that may be used for a variety of interactive functions as described above (e.g., searchable text). Additionally, presentation 510 may include rendering code 523. One example of rendering code implemented using Javascript is described in more detail below.

A user may access presentation 510 using an Internet browser 503 executing on a client computer. When a user logs in, the user may select presentation 510 from a list of available presentations. When presentation 510 is selected, browser 503 may download metadata for each page as well as presentation metadata 522 and rendering code 523. Rendering code 523 interprets the metadata and renders the page for display. For example, the rendering code 523 may read the metadata and access the images for each page using URLs in the metadata. One example display generated by browser 503 for a particular page is shown at 541. Presentation page 541 includes three active regions 542, 543, and 544. As illustrated in this example, active regions may comprise geometric shapes defined by a user. Each active region is linked to a particular backend server application feature. For example, active region 542 is linked to application feature 533, active region 544 is linked to application feature 532, and active region 543 is linked to application feature 531. In this example, the page comprises an image including a pie chart, name (text), and bar graph. A user has defined three active regions over particular portions of the image. A circular active region 542 is defined on top of the pie chart so that a user may select the pie chart and invoke server application feature 533. Similarly, a rectangular active region 544 has been defined over the name John Smith so that a user may learn more about John Smith by invoking feature 532, for example. Likewise, a polygon active region 543 is defined around a graph, for example, to invoke server application feature 531 to obtain data used to generate the graph, for example.

FIG. 5B illustrates selection of an active region according to one embodiment. For instance, if a user selects the active region defined over the portion of the image including "John Smith," a request may be sent to a backend server function (e.g., getEmployeeData) implementing feature 532. The request may include pre-configured custom parameters for generating a query to return data for feature 532. The backend server function may return raw data 540 for John Smith, and data 540 may be provided to the rendering code, which displays the data as a pop-up as shown at 550 in FIG. 5B. In this example, selecting the active region 544 generated a request to feature 532 for employee data about John Smith, which returned information for a performance matrix, experience, education, and a picture for John Smith (See FIG. 5B). Active regions, therefore, allow a user to interactively pull in additional information about various items in the presentation from backend applications to more effectively address questions that might arise during the presentation on-the-fly (e.g., "Tell us more about John Smith").

As mentioned above, presentation pages may have corresponding metadata describing the page. Metadata may describe the page type (e.g., static or interactive) as well as specifying server application services the page interacts with and custom parameters for the services. In one example implementation, a presentation is uploaded, converted to a series of images, and text on each page may be extracted from the presentation and stored as metadata that may be searched. In one embodiment, the extracted text may be stored as presentation metadata 522. For example, a presentation may be uploaded, and names found in the presentation may be extracted and stored as presentation metadata. Hotspots for each name found in the metadata may be automatically generated, for example. In another embodiment, text for particular pages is stored as metadata for that particular page. For example, images and text on particular pages of the uploaded presentation are stored as metadata associated with the particular page. The following illustrates metadata for a static page where an image and text for the particular page are stored as metadata for the page:

```
{
id: 1 // Page/Slide ID
Name: "<slidename>"
Type: "image"              // image of the page
Text: "<slide text>"       // searchable text for page
URL: <path to image>       // path to image of page
}
```

Interactive pages may have the same metadata as static pages with the addition of metadata describing hotspots. The following is an example of metadata for an interactive page created from a static page by the addition of a hotspot:

```
{
id: 1 // Page/Slide ID
Name: "<slidename>"
Type: "image"
Hotspots:
    [      // start of array. one page may include multiple hotspots.
    {      // first hotspot on page
    Shape: "Rect"      // shape of active region.
    Coords: ""79,405,199,436" // coordinates of active region on page
    Type: "<name of backend service>"      // connection to application feature
    <custom_parameter>      // custom parameter set during configuration
    ...
    <custom_parameter>
    }]     // more hotspots may be included in additional array elements
Text: "<slide text>"           // searchable text extracted from uploaded presentation
URL: <path to image>           // location of image for page
}
```

In one example embodiment, the presentation includes a set of Javascript files that define user interface (UI) classes. Each page may have a page "type," where the type of page will have one defined class. An instance of a page class will be created for each individual page. Instances of a class are typically referred to as "objects." The particular class used depends on a "type" defined in the metadata. The page class instance interprets the metadata defined for the page and renders an HTML view for that page. The page class instance will listen for user actions/input on the HTML view (such as a click, key stroke, touch, gesture, etc. . . . ). Some actions may result in one or more AJAX calls to backend services. The page class instance will interpret the AJAX result and it will update or add additional information into the HTML view (such as showing a popup or paginating data).

FIG. 5C illustrates classes and sub-classes for objects used to interact with server application functions. In one embodiment, a base class may have sub-classes for specific types of active regions. In this example, Javascript may include a base class "Hotspot factory" for generating classes for each type of active region. As shown above, metadata for an active region may have a "Type" that specifies a backend service. For example, a TalentCard type may cause base class 560 to instantiate an instance of a TalentCard sub-class, such as TalentCard object 561. Similarly, an OrgChart type may cause base class 560 to instantiate an instance of an OrgChart sub-class, such as OrgChart object 562. Instances of sub-classes related to base class 560 may include objects 561-565 to interface with a variety of backend services 571-575. Each object may send custom requests (e.g., AJAX calls) to corresponding backend services and receive responses (e.g., AJAX results) to render additional information in the display, for example.

Figure 6A:
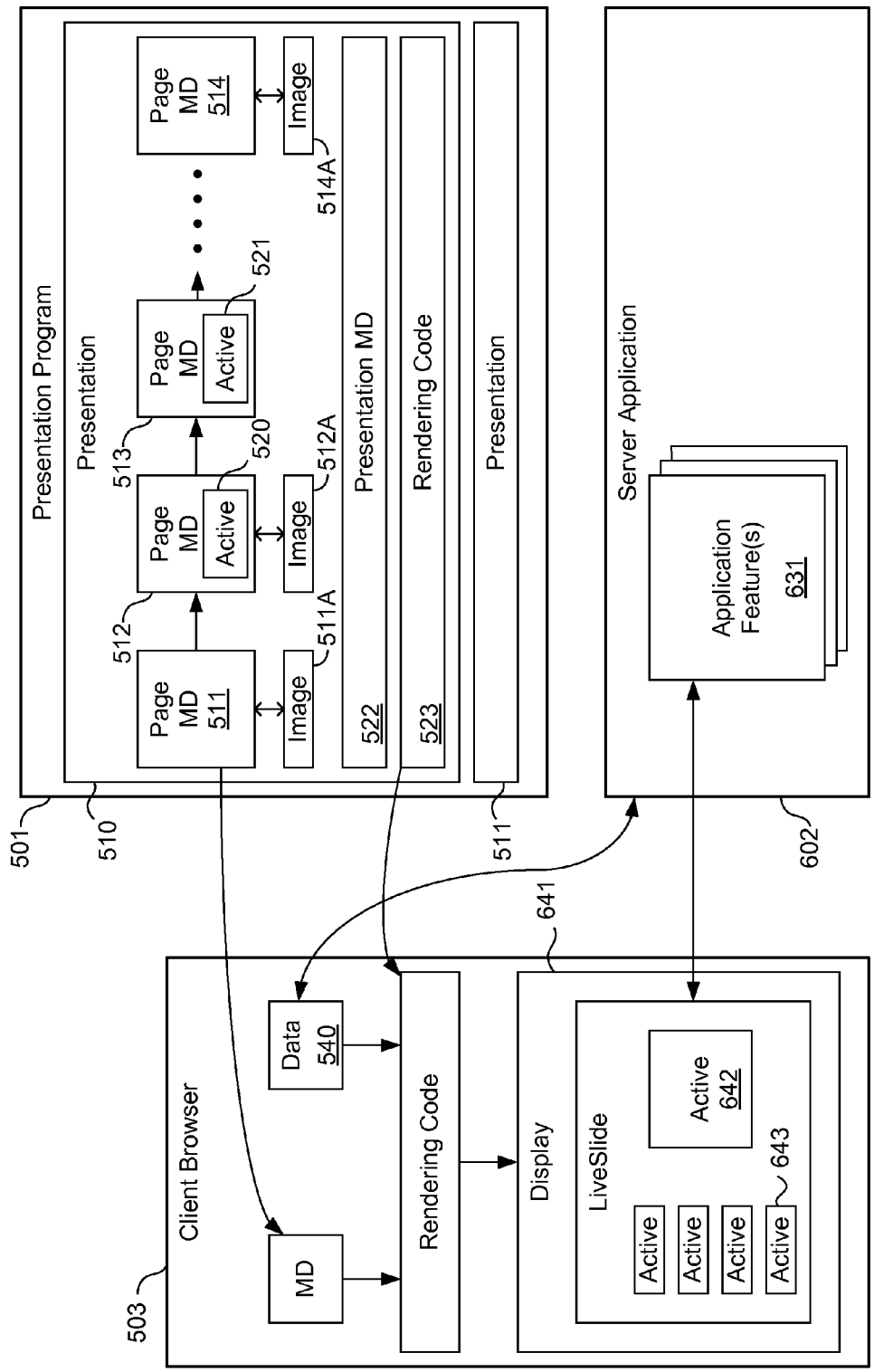
FIGS. 6A-D illustrate an example of Live Pages according to one embodiment.
Figure 6B:
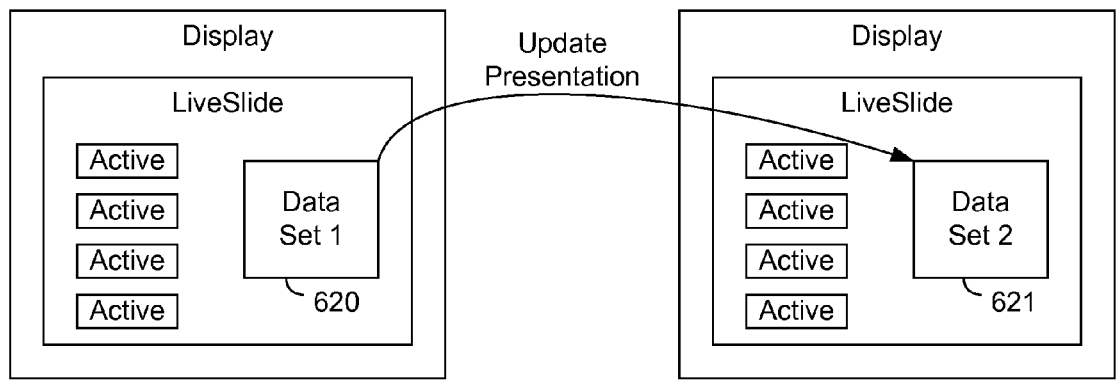

FIGS. 6A-D illustrate an example of Live Pages according to one embodiment. Live Pages may also be referred to herein as active region pages. In one embodiment, a different type of page may be used to access content on backend application features interactively. In this example, page 513 includes an active region 521. When a user views page 513, active region 521 may access a full page of application features so that the entire presentation page becomes interactive. For example, when page 513 is rendered in display 641, application feature 631 may be invoked for all, or substantially all, of the page. Application feature 631 may return a number of active regions including active regions 642 and 643. Rather than predefined active regions on top of an image, as in one example above, a presentation page may expose elements from a page of a server application including multiple active selections rendered in the presentation and used to access additional backend features. Referring to FIG. 6B, an active region may present a data set 620, for example. A user may access and modify data in the data set through the presentation. The backend server application feature may receive and update the data set on the backend, and the updated data set 621 may be presented to the user in display 641.

Figure 6C:
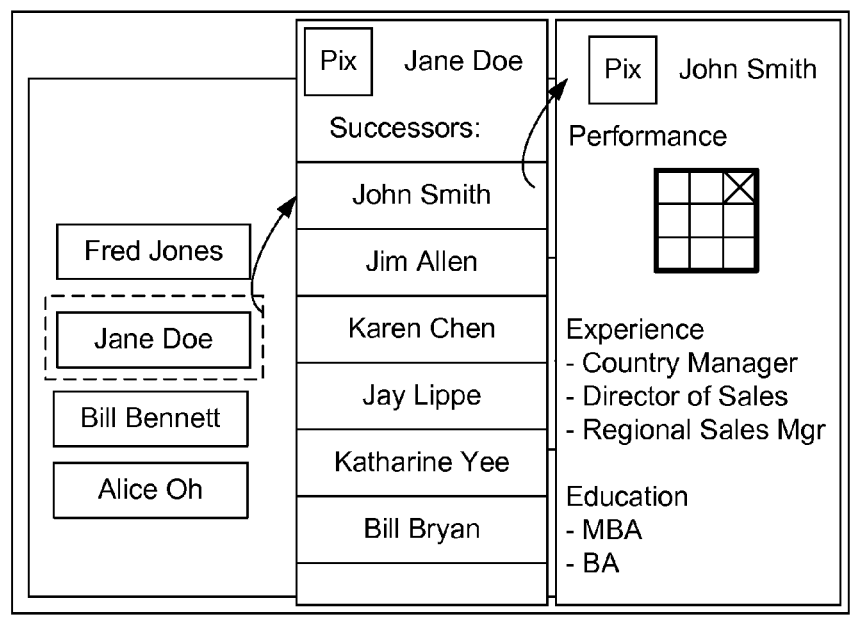

FIG. 6C illustrates another example aspect of a Live Page. In this example, backend feature 631 (FIG. 6A) may present a page with multiple names of employees. The information from the backend is rendered in a display and a user may select any one of the names presented. When a name is selected (Jane Doe), a request is sent to the backend, which returns data to be rendered in the display with additional selections. As shown in FIG. 6C, the backend returns a picture of the selected name (Jane Doe) and a list of successors (people in a company who might be able to fill Jane Doe's position in the future according to a succession plan), for example. The list of successors is also selectable. When the name John Smith is selected, another request is sent to the backend. In this case, a talent card for John Smith is returned and rendered in the display. As described below, in one embodiment functionality of a hotspot (e.g., a sub-class) may be included in a Live Page to access the same backend features (here, a Talent Card) using either Live Pages or hotspots. As illustrated by the above example, a Live Page may expose some or all of a backend feature as part of an interactive presentation, allowing a user to interact with particular features of backend server applications during the course of a presentation, for example.

Referring again to FIG. 6A, interactive pages may have corresponding metadata for invoking backend features. The following is an example metadata format for an active region on a Live Page.

```
{
id: 10          // Slide ID
Type: "<backend service name>"      // Name of application service
                                       providing feature.
<custom_parameter>      // custom parameter set during configuration
...
<custom_parameter>
}
```

Figure 6D:
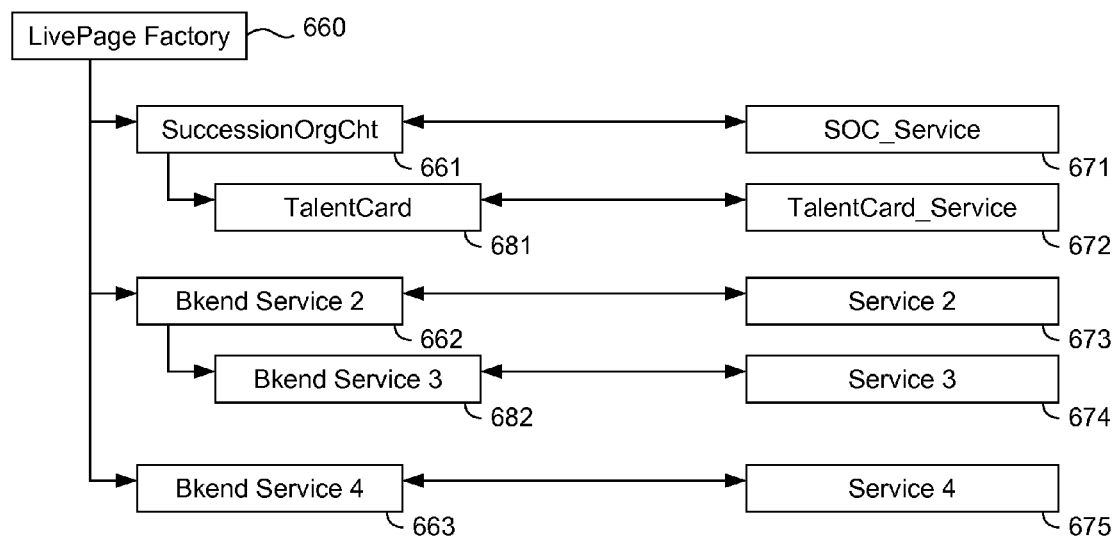

FIG. 6D illustrates classes and sub-classes for objects used to interact with server application functions. In one embodiment, a base class may have sub-classes for specific types of Live Pages. In this example, Javascript may include a base class "LivePage Factory" for generating classes for each type of LivePage page. As shown above, metadata for an active region page may have a "Type" that specifies a backend service. For example, a SuccessionOrgCht may be a type of Live Page. A SuccessionOrgCht type may cause base class 660 to instantiate an instance of a SuccessionOrgCht subclass, such as SuccessionOrgCht object 661. Object 661 may send a message to a SuccessionOrgChart service (SOC_Service) 671 with parameters specific to service 671. The service may respond with data and metadata, which may be rendered into display 641, for example. In one embodiment, service 671 may respond with content that may invoke hotspot active regions and features described above. For example, as illustrated in FIG. 6C, the backend service may respond with a list of active names. Selection of one of the names (e.g., John Smith) may result in the instantiation of a TalentCard object 681 (FIG. 6D), which generates a request to a Talent-Card_Service 672. TalentCard object 681 and TalentCard_Service 672 may be the same object and service used for TalentCard hotspots described above, for example. Thus, some Live Page sub-classes may include hotspot sub-classes so that certain backend features are accessible from both hotspots and LivePages, for example. As illustrated in FIG. 6D, Live Pages may use a variety of different objects 661, 662, and 663 to interact with backend services 671, 673, and 675, respectively, and portions of the returned content from the backend may be rendered and selected to instantiate a variety of objects 681 and 682 for accessing backend features 672 and 674 for both Live Pages and hotspots. As above with regard to FIG. 5C, each object may send custom requests (e.g., AJAX calls) to corresponding backend services and receive responses (e.g., AJAX results) to render additional information in the display, for example.

The following is an example of metadata for a presentation. When a user logs into a remote system, the presentation is returned by a function "getAvailablePresentations." The presentation includes two backend functions that are called for the Live Pages SuccessionOrgData and Matrix Report. A "matrix" type triggers a call to "getMatrixReport," which takes "presentationId" and "matrixReportId" as inputs and provides the outputs shown. A "successionOrgChart" type triggers a call to "getSuccessionOrgData," which takes "presentationId" and "userId" as inputs and provides the outputs shown below. The characters "//" indicate a comment. getAvailablePresentations // pulls presentations in system. Returns array. In this case 1 presentation

```
Input: N/A
Output:
[{
        "aspectHeight": 768,    // optimized display resolution
        "aspectWidth": 1366,
        "id": "0",       // presentation ID
        "label": "My Presentation", // name of presentation
        "lastModifiedDate": "Nov 10 2013",
        "percentComplete": 100,
        "processingComplete": true,
        "slideGroups": [{      // Heading for group of slides; chapter
                "label": "Objectives, Strategy & Capabilities"
            }
        ],
        "slides": [{
                "hotspots": [ ],     // no hotspots
                "id": 1,
                "slideGroupIndex": 0,
                "type": "image",
                "url":
"/ui/talentreview/img/simulation/demo-0.png"   // URL for image of slide
            }, {     // next slide - Succession Org Chart
                "id": 8,
```

```
                    "positionId": 1, // succession org chart
parameters
                    "readiness": [{
                            "backgroundColor": "#2b9600",
                            "fontColor": "#ffffff",
                            "id": 0,
                            "label": "Ready Now"
                    }, {
                            "backgroundColor": "#e9ad19",
                            "fontColor": "#ffffff",
                            "id": 1,
                            "label": "1-2"
                    }, {
                            "backgroundColor": "#ff6600",
                            "fontColor": "#ffffff",
                            "id": 2,
                            "label": "3-5"
                    }
                    ],
                    "slideGroupIndex": 0, // indicates slide
group
                    "type": "successionOrgChart" // Live Slide
            }, {                //next slide Matrix
                    "cellMeta": [ // parameters matrix cells
                            [{
                                    "backgroundColor": "#e2dbd5",
                                    "fontColor": "#df7837"
                            }, {
                                    "backgroundColor": "#e0e0e0",
                                    "fontColor": "#5290a2"
                            }, {
                                    "backgroundColor": "#e2dbd5",
                                    "fontColor": "#d4a330"
                            }
                            ],
                            [{
                                    "backgroundColor": "#e0e0e0",
                                    "fontColor": "#649cac"
                            }, {
                                    "backgroundColor": "#e0e0e0",
                                    "fontColor": "#6199aa"
                            }, {
                                    "backgroundColor": "#cfd7d9",
                                    "fontColor": "#4fa32a"
                            }
                            ],
                            [{
                                    "backgroundColor": "#e1dad4",
                                    "fontColor": "#d4a74d"
                            }, {
                                    "backgroundColor": "#cfd7d9",
                                    "fontColor": "#58a636"
                            }, {
                                    "backgroundColor": "#cfd7d9",
                                    "fontColor": "#5fa93f"
                            }
                            ]
                    ],
                    "id": 9,
                    "matrixReportId": 0,
                    "slideGroupIndex": 0,
                    "type": "matrix",
                    "x": {
                            "id": "performance",
                            "label": "Performance",
                            "ratings": [{
                                    "label": "Low",
                                    "value": "0"
                            }, {
                                    "label": "Medium",
                                    "value": "1"
                            }, {
                                    "label": "High",
                                    "value": "2"
                            }
                            ]
                    },
                    "y": {
                            "id": "potential",
```

```
                            "label": "Potential",
                            "ratings": [{
                                    "label": "Low",
                                    "value": "0"
                            }, {
                                    "label": "Medium",
                                    "value": "1"
                            }, {
                                    "label": "High",
                                    "value": "2"
                            }
                            ]
                    }
            }, {                //next slide with 2 hotspot
                    "hotspots": [{
                            "coords": "79,405,199,436",
                            "shape": "rect",
                            "type": "talentCard",
                            "userInfo": {
                                    "firstName": "Tom",
                                    "fullName": "Tom Jones",
                                    "lastName": "Jones",
                                    "photoUrl":
"/ui/talentreview/img/simulation/spappar1.jpg",
                                    "userId": "tjones1"
                            }
                    }, {
                            "coords": "79,443,214,482",
                            "shape": "rect",
                            "type": "talentCard",
                            "userInfo": {
                                    "firstName": "Charlie",
                                    "fullName": "Charlie Smith",
                                    "lastName": "Smith",
                                    "photoUrl":
"/ui/talentreview/img/simulation/jreed1.jpg",
                                    "userId": "csmith1"
                            }
                    }
                    ],
                    "id": 10,               // slide ID
                    "slideGroupIndex": 0,
                    "type": "image",
                    "url":
"/ui/talentreview/img/simulation/demo-7.png"
            }, {                //next slide with no hotspots
                    "hotspots": [ ],
                    "id": 11,
                    "slideGroupIndex": 0,
                    "type": "image",
                    "url":
"/ui/talentreview/img/simulation/demo-8.png"
            }
            ]
]
getMatrixReport - Backend Server Function
Input: presentationId, matrixReportId
Output:
[{              // returns metadata include list of users for
matrix
            "ratingValues": {
                    "performance": "0",
                    "potential": "1"
            },
            "userInfo": {
                    "firstName": "Alexander",
                    "fullName": "Alexander Thompson",
                    "lastName": "Thompson",
                    "photoUrl":
"/ui/talentreview/img/simulation/athompson1.jpg",
                    "title": "CEO, Ace Enterprises",
                    "userId": "athompson1"
            }
}, {
            "ratingValues": {
                    "performance": "0",
                    "potential": "1"
            },
```

```
            "userInfo": {
                "firstName": "Carla",
                "fullName": "Carla Grant",
                "lastName": "Grant",
                "photoUrl":
"/ui/talentreview/img/simulation/cgrant1.jpg",
                "title": "Executive VP Sales EMEA",
                "userId": "cgrant1"
            }
        },
        ...
        ...
]
getSuccessionOrgData - Backend Function
Input: presentationId, userId
Output:
{       // returns metadata for org chart
    "children": [{
            "childCount": 14,
            "id": 21,
            "incumbent": null,
            "organizationSize": 336,
            "parentId": 1,
            "successors": [{
                    "readiness": 0,
                    "userInfo": {
                        "firstName": "William",
                        "fullName": "William Carver",
                        "lastName": "Carver",
                        "photoUrl":
"/ui/talentreview/img/simulation/wcarver1.jpg",
                        "userId": "wcarver1"
                    }
                }, {
                    "readiness": 0,
                    "userInfo": {
                        "firstName": "Darlene",
                        "fullName": "Darlene Sharp",
                        "lastName": "Sharp",
                        "photoUrl":
"/ui/talentreview/img/simulation/dsharp1.jpg",
                        "title": "Executive VP Europe
East",
                        "userId": "dsharp1"
                    }
                }, {
                    "readiness": 1,
                    "userInfo": {
                        "firstName": "Steven",
                        "fullName": "Steven Thomas",
                        "lastName": "Thomas",
                        "photoUrl":
"/ui/talentreview/img/simulation/sthomas1.jpg",
                        "title": "Executive VP Enterprise",
                        "userId": "sthomas1"
                    }
                }
            ],
            "title": "Executive VP, HR",
            "vacant": true
        },
    ],
    "position": {
        "childCount": 24,
        "id": 1,
        "incumbent": {
            "firstName": "Alexander",
            "fullName": "Alexander Thompson",
            "lastName": "Thompson",
            "photoUrl":
"/ui/talentreview/img/simulation/athompson1.jpg",
            "title": "CEO, Ace Enterprises",
            "userId": "athompson1"
        },
        "organizationSize": 3600,
        "parentId": null,
        "successors": [ ],
        "title": "CEO, Ace Enterprises",
        "vacant": false
    }
}
```

EXAMPLE HARDWARE

Figure 7:
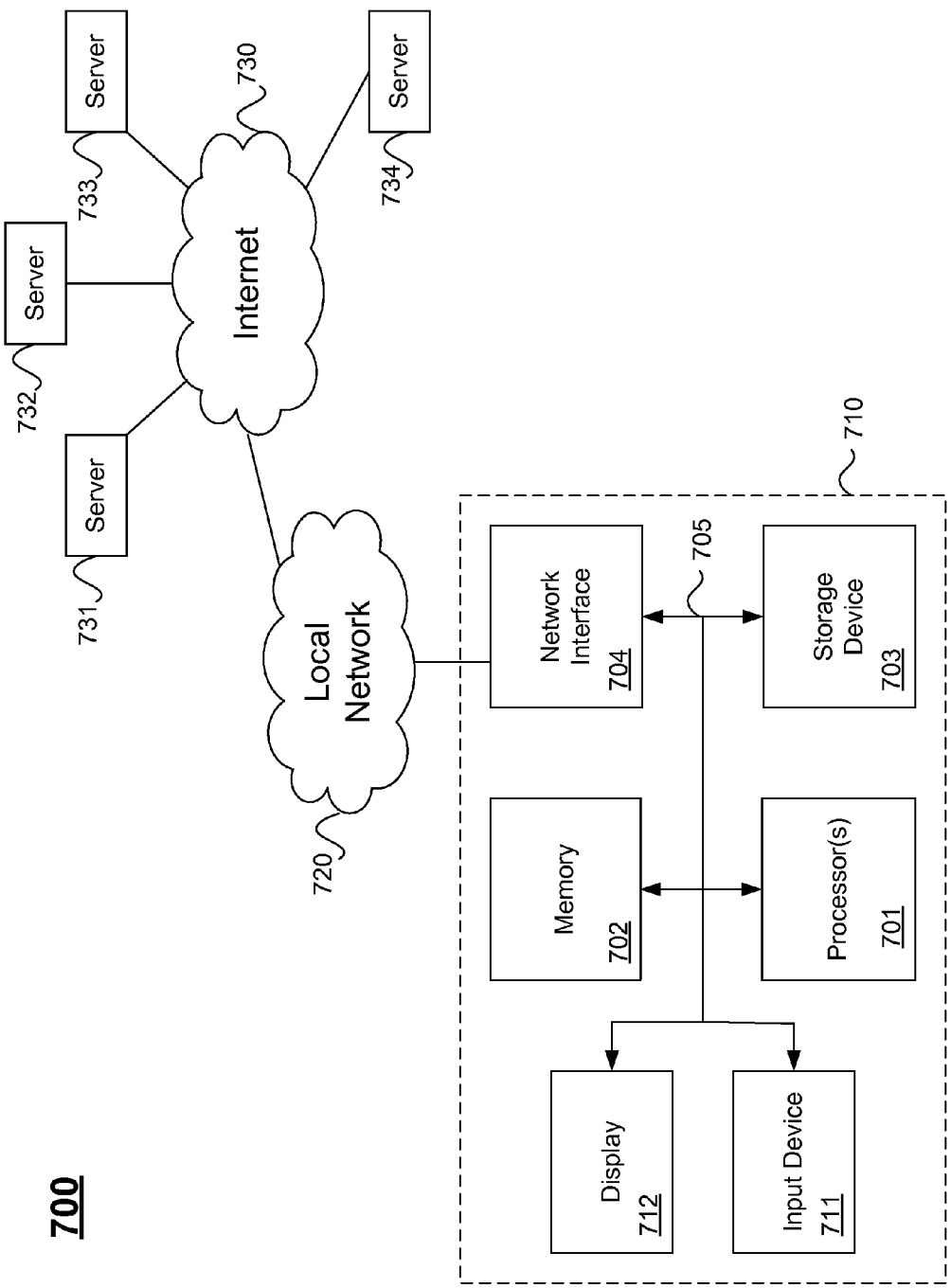
FIG. 7 illustrates hardware of a special purpose computing machine configured with a process according to the above disclosure.

FIG. 7 illustrates hardware of a special purpose computing machine configured with a process according to the above disclosure. The following hardware description is merely one example. It is to be understood that a variety of computers topologies may be used to implement the above described techniques. An example computer system 710 is illustrated in FIG. 7. Computer system 710 includes a bus 705 or other communication mechanism for communicating information, and one or more processor(s) 701 coupled with bus 705 for processing information. Computer system 710 also includes a memory 702 coupled to bus 705 for storing information and instructions to be executed by processor 701, including information and instructions for performing some of the techniques described above, for example. This memory may also be used for storing programs executed by processor 701. Possible implementations of this memory may be, but are not limited to, random access memory (RAM), read only memory (ROM), or both. A storage device 703 is also provided for storing information and instructions. Common forms of storage devices include, for example, a hard drive, a magnetic disk, an optical disk, a CD-ROM, a DVD, a flash or other non-volatile memory, a USB memory card, or any other medium from which a computer can read. Storage device 703 may include source code, binary code, or software files for performing the techniques above, for example. Storage device and memory are both examples of non-transitory computer readable storage mediums.

Computer system 710 may be coupled via bus 705 to a display 712 for displaying information to a computer user. An input device 711 such as a keyboard, touchscreen, and/or mouse is coupled to bus 705 for communicating information and command selections from the user to processor 701. The combination of these components allows the user to communicate with the system. In some systems, bus 705 represents multiple specialized buses, for example.

Computer system 710 also includes a network interface 704 coupled with bus 705. Network interface 704 may provide two-way data communication between computer system 710 and a local network 720. The network interface 704 may be a wireless or wired connection, for example. Computer system 710 can send and receive information through the network interface 704 across a local area network, an Intranet, a cellular network, or the Internet, for example. One example implementation may include a browser executing on a computing system 710 that renders interactive presentations that integrate with remote server applications as described above. In the Internet example, a browser, for example, may access data and features on backend systems that may reside on multiple different hardware servers 731-735 across the network. Servers 731-735 and server applications may also reside in a cloud computing environment, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A method comprising:
receiving a plurality of static presentation pages on a server computer in a first format;
converting the static presentation pages into a second format on the server computer;
specifying, on the server computer, one or more active regions on one or more of the converted static presentation pages;
associating, on the server computer, the active regions with one or more server application features to produce one or more interactive presentation pages;
sending the converted static presentation pages and the interactive presentation pages from the server computer to a client computer for display using the second format,
wherein the converted static presentation pages and the interactive presentation pages are arranged in a predetermined sequence, and wherein the interactive presentation pages are configured to generate a message to a particular server application feature when an associated active region is selected and receive data from the particular server application feature in response to the message,
wherein the static presentation pages are converted into images and wherein the active regions are specified on the images,
wherein each converted presentation page and interactive presentation page has corresponding metadata, and wherein metadata for the interactive presentation pages specifies the server application feature associated with each active region; and
sending rendering code from the server computer to the client computer to render the converted presentation pages and the interactive presentation pages for display and to instantiate one or more classes to access server application features associated with each active region.

2. The method of claim 1 wherein, in a timeline display mode, a plurality of the presentation pages are displayed together in the predetermined sequence, and in a presentation display mode, the presentation pages are displayed one at a time in the predetermined sequence.

3. The method of claim 1 wherein an interactive presentation page including said selected active region is configured to receive changes to the data from a user, and said interactive presentation page is further configured to modify the data in a server application including the particular server application feature.

4. The method of claim 1 wherein the rendering code instantiates different classes for different server application features associated with each active region to access specified server application features.

5. A computer system comprising:
a processor; and
a non-transitory computer readable medium having stored thereon one or more programs, which when executed by the processor, causes the processor to:
receive a plurality of static presentation pages in a first format;
convert the static presentation pages into a second format;
specify one or more active regions on one or more of the converted static presentation pages;
associate the active regions with one or more server application features to produce one or more interactive presentation pages;
send the converted static presentation pages and the interactive presentation pages for display using the second format,
wherein the converted static presentation pages and the interactive presentation pages are arranged in a predetermined sequence, and wherein the interactive presentation pages are configured to generate a message to a particular server application feature when an associated active region is selected and receive data from the particular server application feature in response to the message,
wherein the static presentation pages are converted into images and wherein the active regions are specified on the images,
wherein each converted presentation page and interactive presentation page has corresponding metadata, and wherein metadata for the interactive presentation pages specifies the server application feature associated with each active region; and
send rendering code to render the converted presentation pages and the interactive presentation pages for display and to instantiate one or more classes to access server application features associated with each active region.

6. The computer system of claim 5 wherein, in a timeline display mode, a plurality of the presentation pages are displayed together in the predetermined sequence, and in a presentation display mode, the presentation pages are displayed one at a time in the predetermined sequence.

7. The computer system of claim 5 wherein an interactive presentation page including said selected active region is configured to receive changes to the data from a user, and said interactive presentation page is further configured to modify the data in a server application including the particular server application feature.

8. The computer system of claim 5 wherein the rendering code instantiates different classes for different server application features associated with each active region to access specified server application features.

9. A non-transitory computer readable storage medium storing one or more programs, the one or more programs comprising instructions for:
receiving a plurality of static presentation pages in a first format;
converting the static presentation pages into a second format;
specifying one or more active regions on one or more of the converted static presentation pages;
associating the active regions with one or more server application features to produce one or more interactive presentation pages;
sending the converted static presentation pages and the interactive presentation pages for display using the second format,
wherein the converted static presentation pages and the interactive presentation pages are arranged in a predetermined sequence, and wherein the interactive presentation pages are configured to generate a message to a particular server application feature when an associated active region is selected and receive data from the particular server application feature in response to the message,
wherein the static presentation pages are converted into images and wherein the active regions are specified on the images, wherein each converted presentation page and interactive presentation page has corresponding metadata, and wherein metadata for the interactive presentation pages specifies the server application feature associated with each active region; and sending rendering code from the server computer to the client computer to render the converted presentation pages and the interactive presentation pages for display and to instantiate one or more classes to access server application features associated with each active region.

10. The non-transitory computer readable storage medium of claim 9 wherein an interactive presentation page including said selected active region is configured to receive changes to the data from a user, and said interactive presentation page is further configured to modify the data in a server application including the particular server application feature.

11. The non-transitory computer readable storage medium of claim 9 wherein the rendering code instantiates different classes for different server application features associated with each active region to access specified server application features.

* * * * *